US012804029B2

(12) United States Patent
Saha

(10) Patent No.: US 12,804,029 B2
(45) Date of Patent: Nov. 17, 2026

(54) OPTIMAL LOAD BALANCING THROUGH UNIFORM CONSISTENT HASHING OF LINEAR DATA

(71) Applicant: Freshworks Inc., San Mateo, CA (US)

(72) Inventor: Arrman Anicket Saha, Mumbai (IN)

(73) Assignee: Freshworks Inc., San Mateo, CA (US)

( * ) Notice: Subject to any disclaimer, the term of this patent is extended or adjusted under 35 U.S.C. 154(b) by 128 days.

(21) Appl. No.: 18/733,721

(22) Filed: Jun. 4, 2024

(65) Prior Publication Data

US 2025/0373682 A1 Dec. 4, 2025

(51) Int. Cl.
*H04L 67/1004* (2022.01)

(52) U.S. Cl.
CPC ................................ *H04L 67/1004* (2013.01)

(58) Field of Classification Search
CPC .................................................. H04L 67/1004
See application file for complete search history.

(56) References Cited

U.S. PATENT DOCUMENTS 6,691,165 B1 * 2/2004 Bruck ................ H04L 61/2532 709/227
8,176,486 B2 * 5/2012 Amir Husain .......... H04L 67/34 718/1
10,476,945 B2 * 11/2019 An ...................... H04L 67/1034
10,506,031 B1 * 12/2019 Cheng ................. H04L 67/1095
2011/0223906 A1 * 9/2011 Hall .................... H04W 36/324 455/424
2011/0252161 A1 * 10/2011 Ranney ................. H04L 65/752 709/248
2014/0108626 A1 * 4/2014 Ko ...................... H04L 67/1012 709/221
2016/0127256 A1 * 5/2016 Sharma ................. G06F 16/256 709/226
2016/0296840 A1 * 10/2016 Kaewell .............. H04L 41/5025
2020/0252449 A1 * 8/2020 Wood .................. H04L 67/1027
2020/0287830 A1 * 9/2020 Capper ............... H04L 67/1001
2024/0202837 A1 * 6/2024 Lal ........................ A63F 13/358

* cited by examiner

*Primary Examiner* — Benjamin M Thieu
(74) *Attorney, Agent, or Firm* — LeonardPatel PC; Sheetal S. Patel; Michael A. Leonard, II

(57) ABSTRACT

A computer-implemented method includes initializing, by a processor, users within a network to respective servers to perform one or more tasks or functions within the respective servers. The method also includes identifying, by the processor, if at least one of the users needs to be reassigned to a different server from the original server in which the at least one user was assigned. A determination is made if a new server is being added, or one of the original servers is being removed. Further, the method also includes assigning, by the processor, the at least one user to a different server from among the initialized respective server based on the determination to add the new server or remove one of the original servers.

20 Claims, 6 Drawing Sheets

100

100

200

500

OPTIMAL LOAD BALANCING THROUGH UNIFORM CONSISTENT HASHING OF LINEAR DATA

FIELD

The present invention generally pertains to mapping users to servers within a network in response to one or more servers being added or removed within the network to achieve uniformity and optimal distribution.

BACKGROUND

There is a need to distribute users to servers uniformly and consistently. There is also a need to minimize the amount of times that users are remapped to a new server as the number of servers changes as servers are either added or removed. Current algorithms often require users to be remapped to other servers more frequently than what is desirable for the system. In the real world, users are frequently close to each other and are somewhat sequential. However, current algorithms often have users being moved from server to server very frequently. Such a system that keeps added servers and remap users to multiple servers often lack the uniformity needed to keep a system from chaos or inefficiency.

Consistency in algorithms, such as in modulo or jump hash, often lack the consistency needed to minimize the number of times that servers are remapped to other servers. Often mappings are at random, which lead to more unsteadiness within a system. Users are randomly moved from one server to another server on multiple occasions. In such an instance, it can be difficult for the system to regain steadiness and prevent users from being randomly distributed to various servers throughout the system.

With a modulo algorithm, a number of servers are taken with an integer and user identification (ID). The remainder of the division of the integer user ID by a number of servers is the index of the server in the given list. If the modulo algorithm is used, the algorithm is extremely fast and runs in O(1). There is approximate uniform distribution of the load for random user IDs, and there is perfect uniform distribution of the load for linear sequential integers and user IDs. Nevertheless, there can be disadvantages associated with the modulo algorithm. The modulo algorithm does not have consistent hashing. When a server is added or removed from a list of servers, shuffling of the servers occur. For example, if there are ten servers, and if one of the ten servers is removed, a user originally allocated to server nine is shuffled to server one even if server nine was not removed. In short, users are shuffled to other servers even when their current server is not removed.

Jump hash is another algorithm that has been previously used. With jump hash, the algorithm includes O(Log(N), where N is the number of servers. Although jump hash algorithm runs very fast and has a uniform distribution of the load for random user IDs, there is approximate uniform distribution of load for linear sequential user IDs.

Nevertheless, despite the modulo and jump hash algorithms, a need exists for more stability and uniformity in a system when servers are removed or added within the system. More specifically, there is a need to minimize the number of times the users are remapped to other servers, and to limit which servers to map users when one or more servers are either added or removed within the system.

Thus, an algorithm that is an improvement over prior algorithms should be used for practical situations that occur with users and servers within a network.

SUMMARY

Certain embodiments of the present invention may provide solutions to the problems and needs in the art that have not yet been fully identified, appreciated, or solved by current email communication systems. For example, some embodiments of the present invention pertain to mapping users to servers to provide a uniformity ratio of servers to users within a network.

In an embodiment, a computer-implemented method includes initializing, by a processor, users within a network to respective servers to perform one or more tasks or functions within the respective servers. The computer-implemented method also includes identifying, by the processor, if at least one of the users needs to be reassigned to a different server from the original server in which the at least one user was assigned. A determination is made if a new server is being added, or one of the original servers is being removed. The method also includes assigning, by the processor, the at least one user to a different server from among the initialized respective server based on the determination to add the new server or remove one of the original servers.

In another embodiment, a system includes a processor and a memory comprising a set of instructions, wherein the set of instructions to cause the processor to configure servers to a set position to receive users to perform various functions. The processor also performs iterations of moving the users to different servers from their original servers based on a determination to add one or more new servers at an endpoint of the system, wherein the users are added to the one or more new servers to maintain uniformity. The processor is also configured to remove at least one server among the configured servers at another endpoint of the system at a different time interval.

In yet another embodiment, a computer program, which is embodied on a non-transitory computer-readable medium, is configured to cause a processor to configure a plurality of servers within a network to receive a plurality of users, wherein the servers are configured to receive linear data. The processor is also configured to assign the plurality of users to the servers, wherein each of the servers throughout the network are configured to receive one or more of the plurality of users. Further, the processor is also configured to determine at an endpoint of the network whether to add an additional server or remove one of the servers. An algorithm identifies one or more of the users to reassign to either the additional server, or to one of the original servers. Further, the processor is configured to reassign one or more of the plurality of users based on the determination of adding the additional server or removing one of the original servers.

BRIEF DESCRIPTION OF THE DRAWINGS

In order that the advantages of certain embodiments of the invention be more readily understood, a more particular description of the invention briefly described above can be rendered by reference to specific embodiments that are illustrated in the appended drawings. While it should be understood that these drawings depict typical embodiments of the invention and are not therefore to be considered to be limiting of its scope, the invention can be described and explained with additional specificity and detail through the use of the accompanying drawings, in which.

DETAILED DESCRIPTION OF THE EMBODIMENTS

Figure 1:
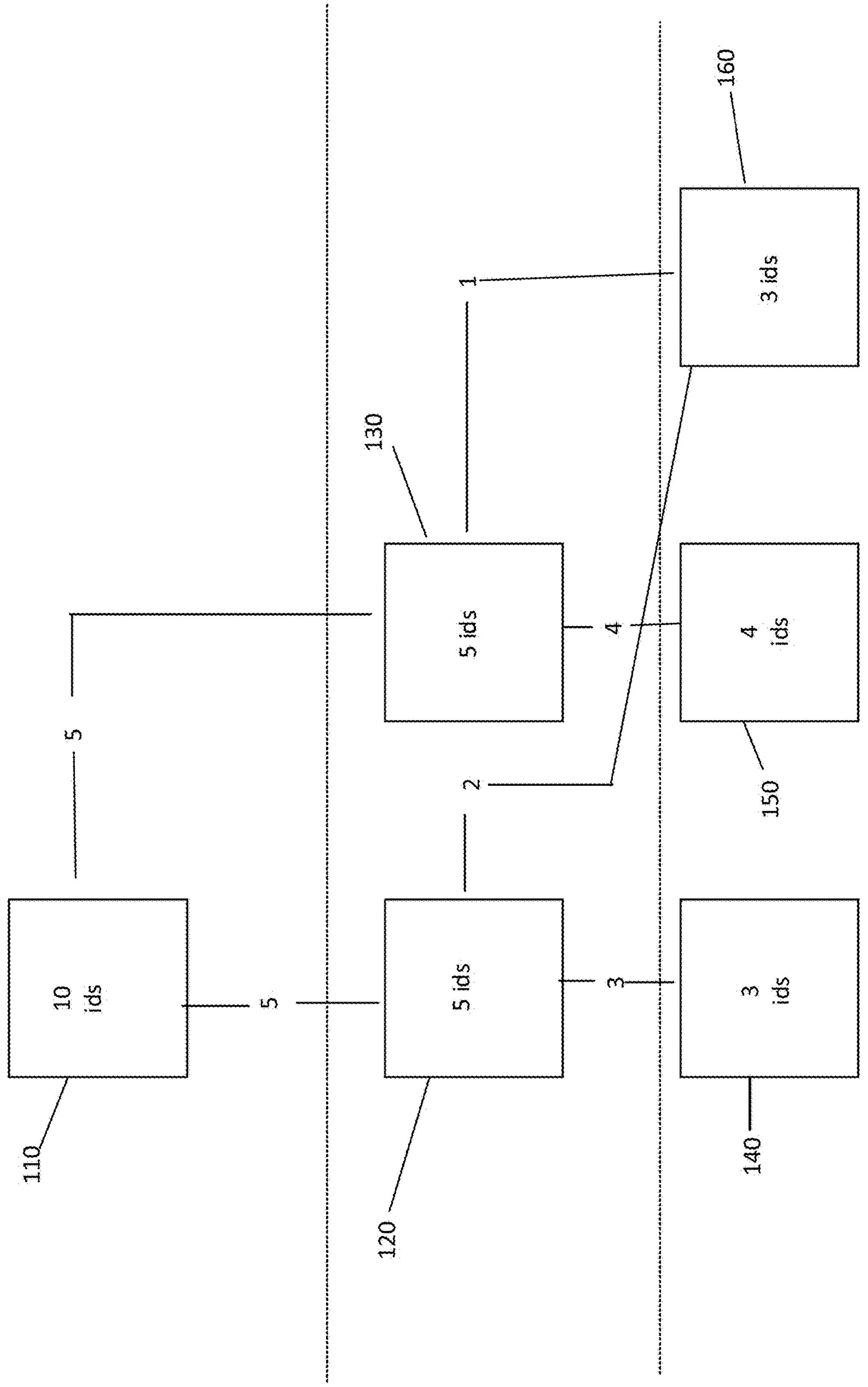
FIG. 1 is a flow diagram where IDs representing users are rerouted within a network to buckets representing servers to maintain a uniformity ratio, according to an embodiment of the present invention.

Some embodiments generally pertain to remapping users to servers within a system when one or more servers within the system are added or removed. A consistent hashing/uniformity algorithm are described in various embodiments. The performance of the uniformity algorithm are also described in comparison to one or more other algorithms that map users to other servers. The uniformity algorithm can be preferred in most practical situations that require a reasonable number of users (IDs) to servers (buckets).

There is a use case where a user sends a request for processing on an endpoint of a system. The endpoint is backed by multiple and separate servers in a distributed system. A question as to which of these servers should be used to process the request of the user may arise. In certain applications, it may be irrelevant to understand which server processes the user request since the output is dependent on user input independent data and not dependent on persistent user specific data.

In other applications, it may be optimal when requests from a specific user are directed to the same server repeatedly. This occurs when the response is dependent on persistent user specific data, which is present somewhere other than the user request. This data is cached on the server instead of needing repeated access from slower storages such as a database or file storage.

In the case of multiple users and multiple servers, a load balancing algorithm specifying which requests from which users go to which servers may be needed. In some embodiments, the algorithm may not store the data once the algorithm is executed. Further, the algorithm may not require data from previous iterations. The algorithm may be given two inputs, i.e., a user ID and a list of servers. However, the algorithm may be given one output, i.e., the server ID should receive the user request. The algorithm may also output the same value when it is run with the same two inputs. The load balancing may not be aware of the total number of users. The load balancing algorithm may be executed by the user or by single/multiple dedicated intermediate load balancer servers. The user IDs that generate these requests are close to linear sequential integers, which normally does not occur with other algorithms currently in use.

The consistent hashing/uniformity algorithm can prevent shuffling of a user ID to two unaffected servers when there is change in the number of servers within the system. For example, when a server is added, there may be one or more users linked or mapped from existing servers to the newly added servers. When a server is removed, one or more users from the removed server are uniformly distributed (or reassigned) to one of the remaining servers. This way, consistent hashing and optimal distribution may be achieved.

When dealing with linear or random data, the system that is applied with this uniformity algorithm may keep the remapping of users to other servers to a minimum. The algorithm may determine that a server is to be added at an endpoint of the system. In such an embodiment, the algorithm enables the system to remap users from one or more adjacent servers to the server, which is being added at the endpoint of the system. The users may not be remapped to other servers in addition to the server that is newly added. In other words, the users may not be remapped to any unaffected server. In another embodiment, the algorithm may instruct the system to remove/destroy one or more servers at one or endpoints of the system. In these embodiments, the users from the removed server can be remapped to one or more adjacent servers. The users in the remaining servers may not be remapped to other servers uniformly to ensure optimal distribution. The algorithm can keep the remapping to a minimum.

In most practical situations, the uniformity of the algorithm perform more steadily as opposed to other algorithms such as the jump hash or modulo algorithms. The uniformity of the algorithm ensures that servers are added or removed at one or more endpoints of the system. In addition, users are remapped in response to one or more servers being added, or when one or more servers are removed from the endpoints of the system. The users may be remapped when their current server is removed from an endpoint of the system, or when users are needed at one or more new servers added at an endpoint of the system. A more optimal distribution may be achieved due to minimizing the maximum number of users assigned to a server within the system.

The proposed uniformity algorithm combines the advantages of other algorithms without the disadvantage of not having consistent hashing. The uniformity algorithm runs in O(N) and is faster than other algorithms that are currently being used. The uniformity algorithm has a uniform distribution of load for random user IDs. Further, the uniformity algorithm may have better uniform distribution of load for linear sequential integer user IDs in comparison to other algorithms currently being used.

FIG. 1 is a diagram illustrating system 100 in which users are remapped/rerouted to servers to provide a number of users/server, according to an embodiment of the present invention. In some embodiments, an algorithm is applied to system 100 to maintain optimal distribution. The number of users are represented by the IDs. The servers are represented by the buckets. Various systems in other embodiments include any number of users/IDs and servers/buckets. For ease of explanation, system 100 includes six buckets 110, 120, 130, 140, 150, 160. Bucket 110 includes 10 IDs or users. The ratio of users to servers or IDs to buckets should be approximately when the IDs/bucket are greater than the number of servers/4. The ratio can be a uniformity ratio and optimal distribution that should occur for each of the servers or buckets 110, 120, 130, 140, 150, 160.

Bucket 110 originally has ten users or ten IDs. Nevertheless, five of the IDs can be remapped to another bucket 120. In addition, another five IDs from bucket 110 can be remapped to bucket 130. Bucket 110 may be destroyed and removed by the algorithm applied onto system 100. The algorithm may remove buckets, such as bucket 110, at an endpoint of system 100. Another bucket may be set up by the algorithm at a later interval at the same endpoint or at another endpoint of system 100 to receive more users or IDs to maintain the consistent hashing, uniformity, and optimal distribution. As mentioned above, the uniformity ratio should include a number of users per bucket in line with the IDs/bucket greater than the number of buckets/4. As such, the algorithm may cause system 100 to keep moving users to servers to maintain optimal distribution in response to a bucket being destroyed or added at an endpoint of system 100.

Referring to bucket 120, bucket 120 may originally be positioned at one of the endpoints of system 100. However, when bucket 120 is destroyed or if another bucket is added within system 100, three of the IDs are remapped to bucket 140. Further, two of the IDs from bucket 120 are remapped to bucket 160. The IDs from removed bucket 120 are remapped to other buckets within system 100 to maintain the consistent hashing, uniformity, and optimal distribution. With respect to bucket 130, when bucket 130 is removed, 4 of the IDs are moved to bucket 150. Further, one ID from bucket 130 is remapped to bucket 160. The IDs within system 100 are remapped or rerouted to an adjacent server or bucket when one of the buckets is destroyed within an endpoint of system 100.

Any buckets that are removed from system 100 are removed at the endpoint of system 100. As such, bucket 110, as an example, can be removed from system 100 to increase the ratio of IDs/bucket to be in line with the consistent hashing. Buckets may not be added or removed within the middle region of system 100. The IDs/users are remapped to adjacent servers to maintain the uniformity and optimal distribution.

System 100 maintains the uniformity ratio of having a number of users for each bucket. The algorithm can continuously enable system 100 to remap users/IDs to buckets when buckets are added at an endpoint, or removed from an endpoint to ensure that the uniformity ratio is achieved, and that the need for remapping users to servers is reduced. As opposed to other algorithms (modulo, jump hash), system 100 can enable the uniformity ratio to be achieved to eventually reduce the need for users to be remapped to other servers and achieve a more optimal distribution and maintain consistent hashing. The maximum number of users that are assigned to a server can be minimized within the system. The algorithm can be very fast and operate in O(N), where N is the number of servers. There can be uniform distribution of load for random user IDs, and there can be better uniform distribution of load for linear sequential user IDs.

Figure 2:
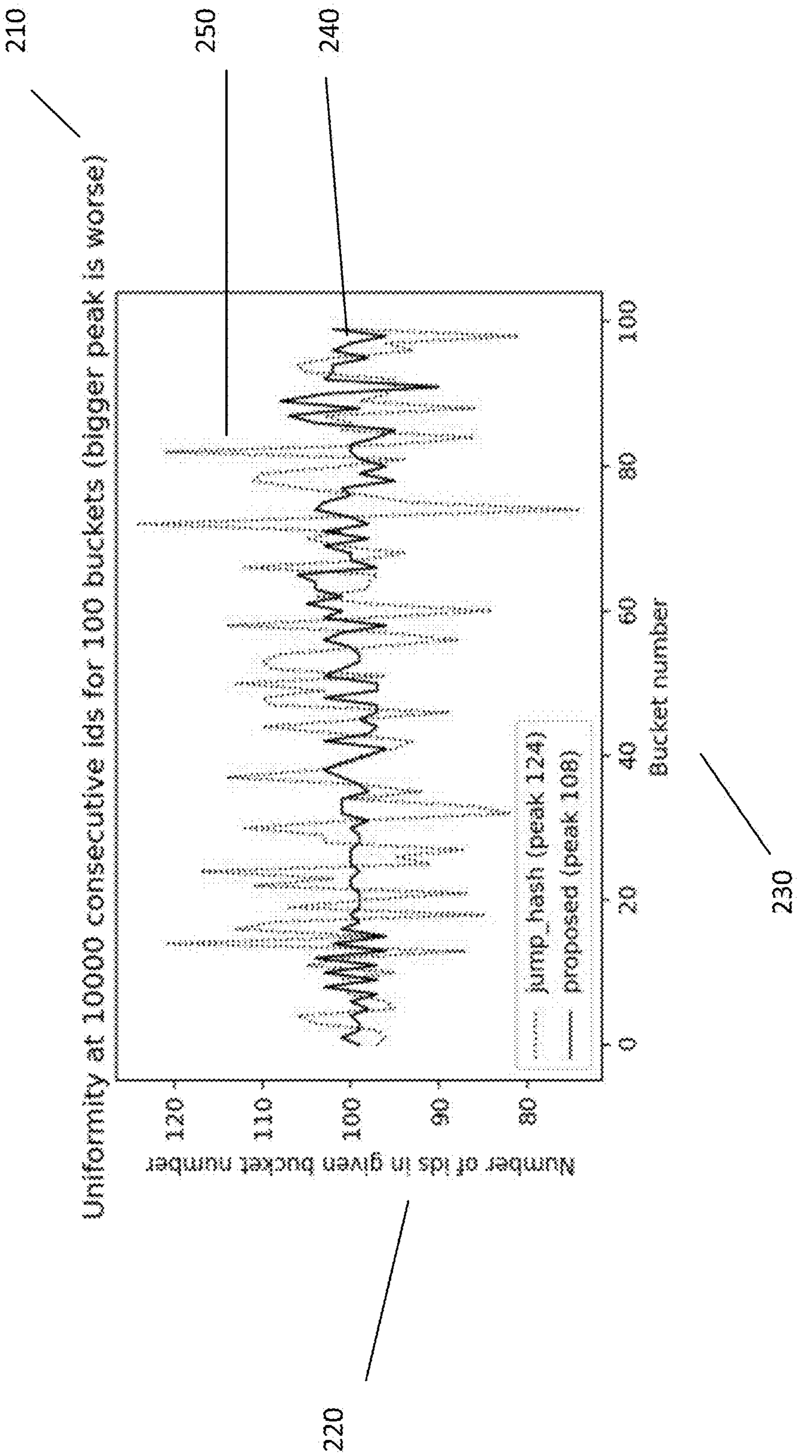
FIG. 2 is a graph illustrating a relationship with the proposed uniformity algorithm to a jump hash algorithm, according to an embodiment of the present invention.

In FIG. 2, graph 200 illustrates a relationship with the proposed uniformity algorithm to a jump hash algorithm, according to an embodiment of the present invention. As mentioned above, whenever a server is removed at an endpoint, users are moved to one of the adjacent servers within the system. Further, whenever a new server/bucket is added at an endpoint, users from adjacent servers are then moved to that newly added server. Users are not mapped to other servers unless a server is removed or added from the endpoint of the system. The need to remap users to servers is thereby reduced and uniformity and optimal distribution is maintained more than in the jump hash algorithm where users are moved from one server to another server more frequently.

Graph 200 illustrates uniformity 210 at 10,000 consecutive ids for 100 buckets. Graph 200 also illustrates the number of ids in a given bucket number 220 vs the bucket number 230. Graph 200 also illustrates what occurs when there are one thousand users and one hundred buckets or servers. In addition, uniformity algorithm 240 is shown in comparison to jump hash algorithm 250. In this illustration, uniformity algorithm 240 illustrates a steady curve when the number of users increases per bucket. The steady curve illustrates how the number of users being remapped to other servers is kept to a minimum. Consistent hashing is shown along with optimal distribution. As mentioned above, users are mapped to other servers if a server is removed or added from an endpoint within the system 200. In addition, a valid remapping occurs sequentially. Servers that are not at an endpoint of the system are not removed or added. Moreover, the range for uniformity algorithm 240 has values of 90 to 108. As such, the number of users that need to be remapped to other servers is kept to a minimum and in line with the uniformity ratio of the number of users/server being greater than the number of servers/4.

Jump hash algorithm 250, in contrast to uniformity algorithm 240 shows a more uneven curve. With jump hash algorithm 250, as the number of users increases in relation to the number of servers, the amount of users being remapped to the servers occurs more frequently. The more frequent remapping of users to other servers is shown by the unevenness of the jump hash algorithm. Moreover, in contrast to uniformity algorithm 240, the jump range is from a 74 to 124, which illustrates more users being remapped continuously to other servers, and less consistent hashing, uniformity and optimal distribution. Unlike jump hash algorithm 250, the minimum and maximum range for the uniformity algorithm is from 90 to 108. As such, this range illustrates a fewer number of users being remapped from one server to another.

As uniformity algorithm 240 remapping users to servers when another server is removed or added at an endpoint within system 200, the amount of rerouting or remapping of users to other servers is kept to a lesser range than what is typically shown with jump hash algorithm 250. Uniformity algorithm 240 ensures that the uniformity ratio of the number of users/server is greater than the number of servers/four. For practical cases where there is a practical number of users to servers, with uniformity algorithm 240, the amount of remapping of users to other servers is kept at a minimum. Uniformity algorithm 240 thereby ensures more optimal distribution. Moreover, there can be uniform distribution of the load for linear and sequential user IDs.

Figure 3:
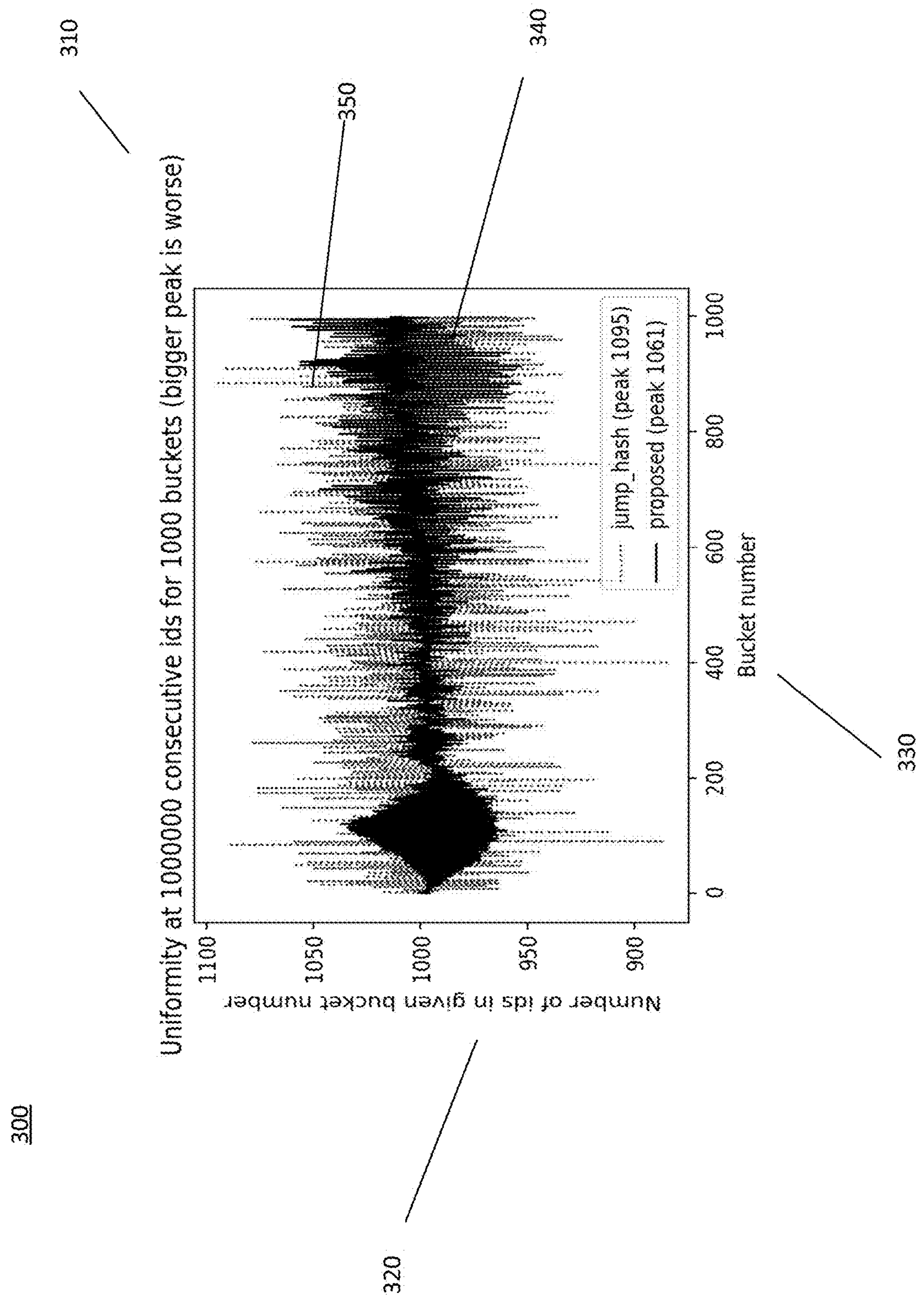
FIG. 3 is a graph illustrating a relationship with the proposed uniformity algorithm to the jump hash algorithm when there is an excess number of users represented by IDs, according to an embodiment of the present invention.

Referring to FIG. 3, graph 300 is shown where random data is used as opposed to the linear data shown above in FIG. 2. Moreover, with FIG. 3, graph 300 illustrates uniformity 310 at 1,000,000 consecutive IDs for 1000 buckets, wherein an excess number of users/IDs is shown. Graph 300 illustrates an excess number of users is illustrated with random data. Graph 300 also illustrates excess number of IDs 320 and bucket number 330. In addition, graph 300 also illustrates the relationship between uniformity algorithm 340 and jump hash algorithm 350.

Uniformity algorithm 340 can be very comparable to jump hash algorithm 350 in the extreme case of random data and an excess number of ids 320. As graph 300 illustrates, even when excess number of IDs 320 increases and bucket number 330 increases, the curve of uniformity algorithm 340 is comparable with jump hash algorithm 350. Even with random data and excess number of IDs 320, the number of users having to be remapped to other servers can still be comparable to that of jump hash algorithm 350. Further, even with random data, the minimum and maximum range for the uniformity algorithm 340 is comparable with jump hash algorithm 350. Uniformity algorithm 340 can ensure that the number of users being swapped to other servers does not happen in excess. Users may be remapped to another server if a current server is being removed or if a new server is being added at an endpoint of the system.

Graph 300 also illustrates, as the number of servers increases, the maximum and minimum range of uniformity algorithm 340 is lesser than that of jump hash algorithm 350. Even in an unlikely situation with excess number of IDs 320, the number of IDs being remapped to other servers does not occur as often as with jump hash algorithm 350. The difference between the maximum and minimum range of jump hash algorithm 350 is greater than that of uniformity algorithm 340 as bucket number 330 increases. Accordingly, even with random data and excess number of IDs 320, uniformity algorithm 340 performs very favorably in comparison to jump hash algorithm 350, and provides more optimal distribution and consistent hashing. Uniformity algorithm 340 can provide better uniform distribution of the load for random user IDs in comparison to jump hash algorithm 350.

Figure 4:
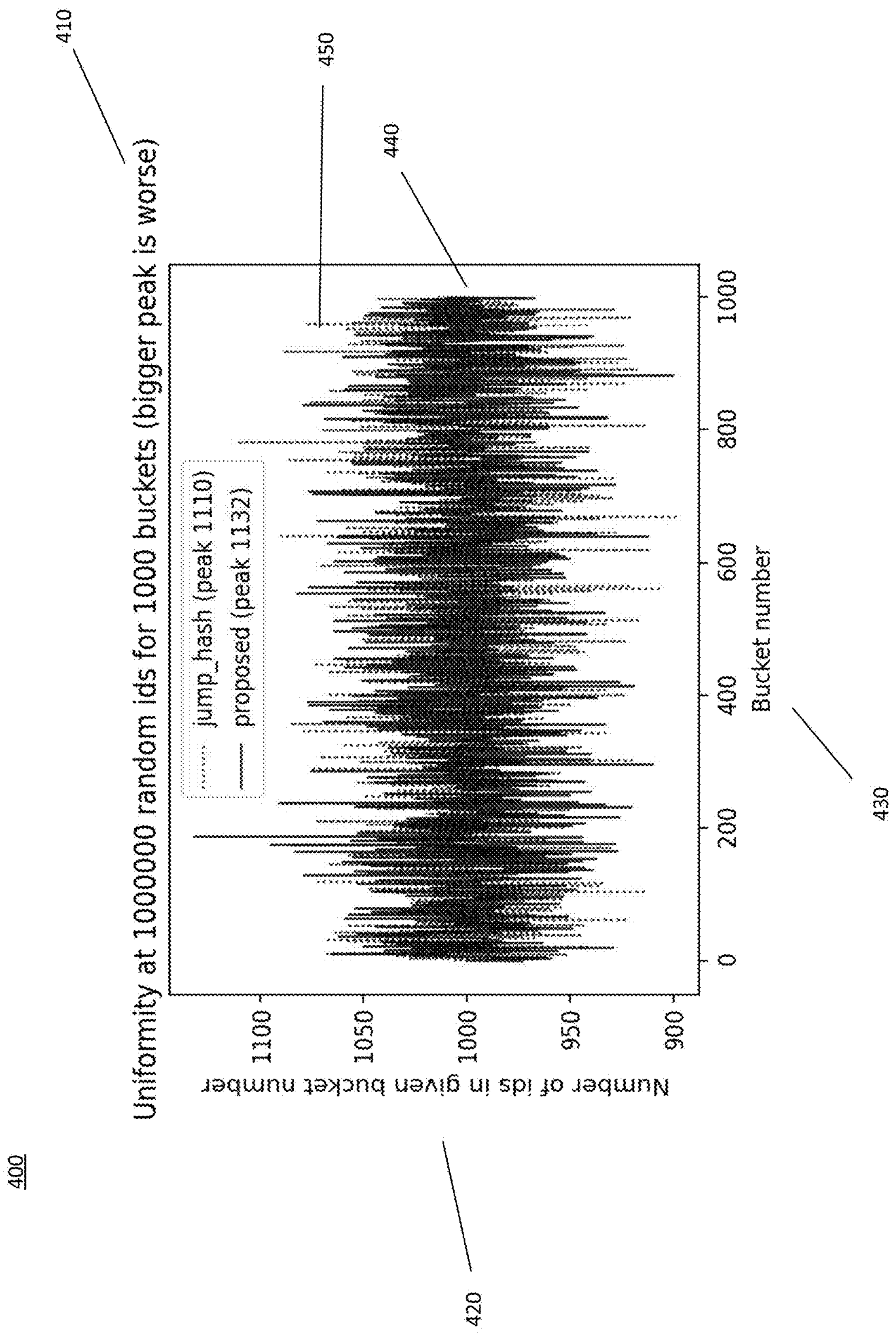
FIG. 4 is another graph depicting a relationship between the uniformity algorithm and jump hash algorithm when there is an excess number of IDs, according to an embodiment of the present invention.

Referring to FIG. 4, graph 400 is shown in which linear data, as opposed to random data, is used in graph 400 with an excess number of IDs and a large number of buckets/servers. Graph 400 illustrates uniformity 410 at 1,000,000 random IDs for 1000 buckets. Graph 400 also illustrates excess number of IDs 420 of one million IDs and bucket number 430 of one thousand buckets, unhashed. In addition, uniformity algorithm 440 is shown in relation to jump hash algorithm 450. With the linear data, the data can be more sequential as opposed to random. Nevertheless, uniformity algorithm 440, as the servers increase, may continue to add users to the newly added servers within the endpoint of the system. In addition, users from removed servers may be remapped to other servers when their servers have been removed. Users may not be remapped to another server unless a new server has been added or an original server has been removed. The amount of remapping of users to other servers can be kept to a minimum even with excess number of IDs 420 and as bucket number 430 increases.

In contrast, jump hash algorithm 450 shows more movement between users to other servers as the number of servers increases. The movement of users to other servers occurs more frequently. The peak of jump hash algorithm 450 is clearly higher than that of uniformity algorithm 440. Jump hash algorithm 450 can have users moving to other servers much more frequently, and not have the consistent hashing of uniformity algorithm 440. As graph 400 clearly shows, from beginning to end, jump hash algorithm 450 shows a higher maximum and minimum peak throughout as compared to uniformity algorithm 440. This relationship continues as bucket number 430 goes from the minimum to maximum number. Accordingly, uniformity algorithm 440 prevents users from unnecessarily being moved from server to server unless a new server is added or removed at an endpoint within the system 400. As such, the maximum and minimum peak of uniformity algorithm 440 is more steady throughout as opposed to jump hash algorithm 450. Accordingly, uniformity algorithm 440 achieves a more optimal distribution. Uniformity algorithm 440 provides better uniform distribution of the load for linear and sequential user IDs in comparison to jump hash algorithm 450.

Figure 5:
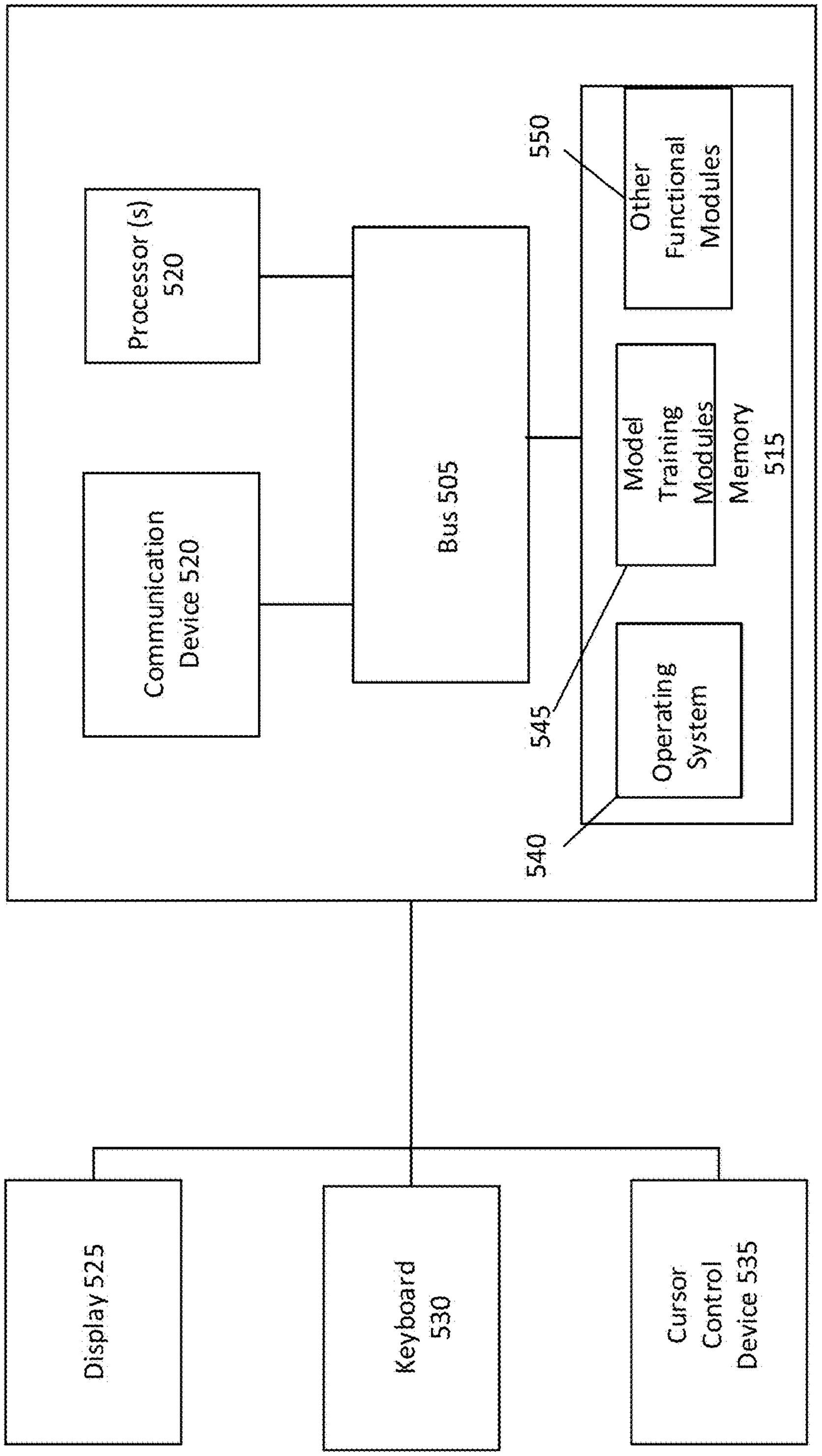
FIG. 5 is a diagram illustrating a computing system configured to perform label biasing of data using interpolation, according to an embodiment of the present invention.

FIG. 5 is an architectural diagram illustrating a computing system 500 that can perform the algorithm that promotes uniformity of users and severs within the computing system 500, according to an embodiment of the present invention. In some embodiments, computing system 500 may be one or more of the computing systems depicted and/or described herein. Computing system 500 includes a bus 505 or other communication mechanism for communicating information, and processor(s) 510 coupled to bus 505 for processing information. Processor(s) 510 may be any type of general or specific purpose processor, including a Central Processing Unit (CPU), an Application Specific Integrated Circuit (ASIC), a Field Programmable Gate Array (FPGA), a Graphics Processing Unit (GPU), multiple instances thereof, and/or any combination thereof. Processor(s) 510 may also have multiple processing cores, and at least some of the cores may be configured to perform specific functions. Multi-parallel processing may be used in some embodiments. In certain embodiments, at least one of processor(s) 510 may be a neuromorphic circuit that includes processing elements that mimic biological neurons. In some embodiments, neuromorphic circuits may not require the typical components of a Von Neumann computing architecture.

Computing system 500 further includes a memory 515 for storing information and instructions to be executed by processor(s) 510. Memory 515 can be comprised of any combination of Random Access Memory (RAM), Read Only Memory (ROM), flash memory, cache, static storage such as a magnetic or optical disk, or any other types of non-transitory computer-readable media or combinations thereof. Non-transitory computer-readable media may be any available media that can be accessed by processor(s) 510 and may include volatile media, non-volatile media, or both. The media may also be removable, non-removable, or both.

Additionally, computing system 500 includes a communication device 520, such as a transceiver, to provide access to a communications network via a wireless and/or wired connection. In some embodiments, communication device 520 may be configured to use Frequency Division Multiple Access (FDMA), Single Carrier FDMA (SC-FDMA), Time Division Multiple Access (TDMA), Code Division Multiple Access (CDMA), Orthogonal Frequency Division Multiplexing (OFDM), Orthogonal Frequency Division Multiple Access (OFDMA), Global System for Mobile (GSM) communications, General Packet Radio Service (GPRS), Universal Mobile Telecommunications System (UMTS), cdma2000, Wideband CDMA (W-CDMA), High-Speed Downlink Packet Access (HSDPA), High-Speed Uplink Packet Access (HSUPA), High-Speed Packet Access (HSPA), Long Term Evolution (LTE), LTE Advanced (LTE-A), 802.11x, Wi-Fi, Zigbee, Ultra-WideBand (UWB), 802.16x, 802.15, Home Node-B (HnB), Bluetooth, Radio Frequency Identification (RFID), Infrared Data Association (IrDA), Near-Field Communications (NFC), fifth generation (5G), New Radio (NR), any combination thereof, and/or any other currently existing or future-implemented communications standard and/or protocol without deviating from the scope of the invention. In some embodiments, communication device 520 may include one or more antennas that are singular, arrayed, phased, switched, beamforming, beamsteering, a combination thereof, and or any other antenna configuration without deviating from the scope of the invention.

Processor(s) 510 are further coupled via bus 505 to a display 525, such as a plasma display, a Liquid Crystal Display (LCD), a Light Emitting Diode (LED) display, a Field Emission Display (FED), an Organic Light Emitting Diode (OLED) display, a flexible OLED display, a flexible substrate display, a projection display, a 4K display, a high definition display, a Retina® display, an In-Plane Switching (IPS) display, or any other suitable display for displaying information to a user. Display 525 may be configured as a touch (haptic) display, a three dimensional (3D) touch display, a multi-input touch display, a multi-touch display, etc. using resistive, capacitive, surface-acoustic wave (SAW) capacitive, infrared, optical imaging, dispersive signal technology, acoustic pulse recognition, frustrated total internal reflection, etc. Any suitable display device and haptic I/O may be used without deviating from the scope of the invention.

A keyboard 530 and a cursor control device 535, such as a computer mouse, a touchpad, etc., are further coupled to bus 505 to enable a user to interface with computing system. However, in certain embodiments, a physical keyboard and mouse may not be present, and the user may interact with the device solely through display 525 and/or a touchpad (not shown). Any type and combination of input devices may be used as a matter of design choice. In certain embodiments, no physical input device and/or display is present. For instance, the user may interact with computing system 500 remotely via another computing system in communication therewith, or computing system 500 may operate autonomously.

Memory 515 stores software modules that provide functionality when executed by processor(s) 510. The modules include an operating system 540 for computing system 500. The modules further include model training modules 545 configured to perform all or part of the processes described herein or derivatives thereof. Computing system 500 may include one or more additional functional modules 550 that include additional functionality.

One skilled in the art can appreciate that a "system" could be embodied as a server, an embedded computing system, a personal computer, a console, a personal digital assistant (PDA), a cell phone, a tablet computing device, a quantum computing system, or any other suitable computing device, or combination of devices without deviating from the scope of the invention. Presenting the above-described functions as being performed by a "system" is not intended to limit the scope of the present invention in any way, but is intended to provide one example of the many embodiments of the present invention. Indeed, methods, systems, and apparatuses disclosed herein may be implemented in localized and distributed forms consistent with computing technology, including cloud computing systems.

It should be noted that some of the system features described in this specification have been presented as modules, in order to more particularly emphasize their implementation independence. For example, a module may be implemented as a hardware circuit comprising custom very large scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices, graphics processing units, or the like.

A module may also be at least partially implemented in software for execution by various types of processors. An identified unit of executable code may, for instance, include one or more physical or logical blocks of computer instructions that may, for instance, be organized as an object, procedure, or function. Nevertheless, the executables of an identified module need not be physically located together, but may include disparate instructions stored in different locations that, when joined logically together, comprise the module and achieve the stated purpose for the module. Further, modules may be stored on a computer-readable medium, which may be, for instance, a hard disk drive, flash device, RAM, tape, and/or any other such non-transitory computer-readable medium used to store data without deviating from the scope of the invention.

Indeed, a module of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

Figure 6:
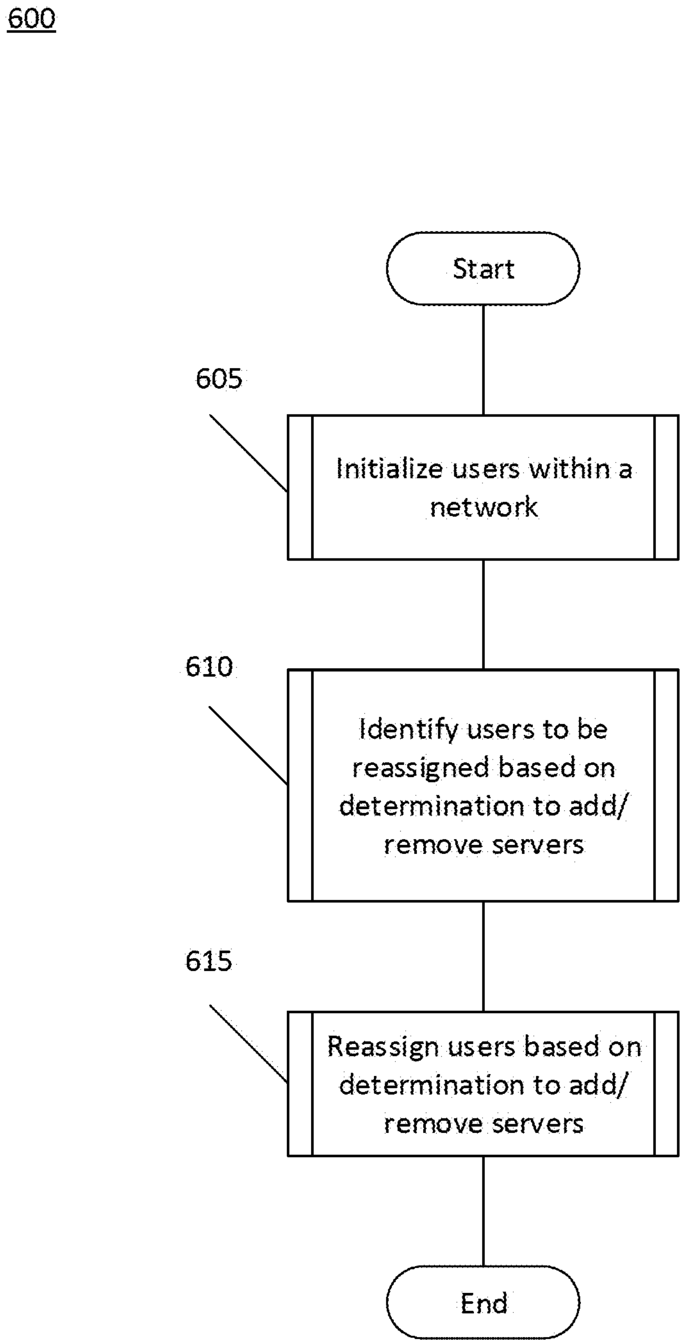
FIG. 6 is a flow diagram illustrating a method for assigning users to servers, and then remapping users to other servers to maintain a uniformity ratio, according to an embodiment of the present invention.

FIG. 6 is flow diagram 600 for remapping users to other servers when a server is either added or removed from an endpoint within the system, according to an embodiment of the present invention. In some embodiments, the users within the network are initialized and placed within one or more of the original servers at 605. The users may have an original placement in one of the original servers. Some of the servers are at an endpoint within the system, while other servers are within the middle point and other points within the system. The algorithm may then determine that a server needs to be destroyed at one of the endpoints of the system. The algorithm may also determine that one or more servers needs to be added at one of the endpoints of the system. As such, at 610, the algorithm may determine if one or more of the users need to be reassigned to a new server being added at the endpoint of the system. In addition, the algorithm, may also determine if one or more of the users should be remapped to an adjacent server when one or more of the servers at an endpoint is being destroyed.

The algorithm ensures uniformity and that the remapping of users to other servers is kept at a minimum with an optimal distribution being achieved within the system. It should be appreciated that the users are not remapped to other servers unless one or more of the servers is being added or removed. In addition, servers are added or removed at the endpoints of the system. At 615, one or more of the users are reassigned. In these embodiments, the one or more users are reassigned to one or more new servers added at an endpoint of the system. In an alternative embodiment, one or more of the users are reassigned to another server when one or more of the servers is destroyed at an endpoint of the system. The algorithm ensures uniformity and optimal distribution by remapping users when a server has either been added or destroyed at one or more endpoints within the system. In comparison to other algorithms, the uniformity algorithm ensures consistent hashing, and better uniform distribution of random User IDs and linear and sequential user IDs.

In some embodiments, the computer program may be embodied on a non-transitory computer-readable medium. The computer-readable medium may be, but is not limited to, a hard disk drive, a flash device, RAM, a tape, and/or any other such medium or combination of media used to store data. The computer program may include encoded instructions for controlling processor(s) of a computing system (e.g., processor(s) 510 of computing system 500 of FIG. 5) to implement all or part of the process steps described in FIGS. 1 and 6, which may also be stored on the computer-readable medium.

The computer program can be implemented in hardware, software, or a hybrid implementation. The computer program can be composed of modules that are in operative communication with one another, and which are designed to pass information or instructions to display. The computer program can be configured to operate on a computer, an ASIC, or any other suitable device.

It can be readily understood that the components of various embodiments of the present invention, as generally described and illustrated in the figures herein, may be arranged and designed in a wide variety of different configurations. Thus, the detailed description of the embodiments of the present invention, as represented in the attached figures, is not intended to limit the scope of the invention as claimed, but is merely representative of selected embodiments of the invention.

The features, structures, or characteristics of the invention described throughout this specification may be combined in any suitable manner in one or more embodiments. For example, reference throughout this specification to “certain embodiments,” “some embodiments,” or similar language means that a particular feature, structure, or characteristic described in connection with the embodiment is included in at least one embodiment of the present invention. Thus, appearances of the phrases “in certain embodiments,” “in some embodiment,” “in other embodiments,” or similar language throughout this specification do not necessarily all refer to the same group of embodiments and the described features, structures, or characteristics may be combined in any suitable manner in one or more embodiments.

It should be noted that reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art can recognize that the invention can be practiced without one or more of the specific features or advantages of a particular embodiment. In other instances, additional features and advantages may be recognized in certain embodiments that may not be present in all embodiments of the invention.

One having ordinary skill in the art can readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention. In order to determine the metes and bounds of the invention, therefore, reference should be made to the appended claims.

The invention claimed is:

1. A computer-implemented method, comprising:

initializing users, by a processor, within a network to respective servers to perform one or more tasks or functions within the respective servers;

identifying, by the processor, if at least one of the users needs to be reassigned to a different server from the original server in which the at least one user was assigned, wherein a determination is made if a new server is being added at an endpoint of the network, or one of the original servers is being removed from the endpoint of the network; and assigning, by the processor, the at least one user to a different adjacent server from among the initialized respective server based on the determination to add the new server or remove one of the original servers at the endpoint of the network, wherein the assigning is performed in accordance with a uniformity algorithm, the uniformity algorithm performs remapping of the users such that a uniformity ratio of a number of the users per server is maintained greater than a number of the servers.

2. The computer-implemented method of claim 1, further comprising:

adding, by the processor, the new server at an endpoint within the network.

3. The computer-implemented method of claim 1, further comprising:

performing, by the processor, additional iterations of removing at least one of the initialized servers.

4. The computer-implemented process of claim 1, further comprising:

adding, by the processor, additional new servers to enable the other users to be transferred to the additional new servers.

5. The computer-implemented method of claim 1, further comprising:

removing, by the processor, at least one of the respective servers from the endpoint within a system to transfer one or more of the users to an adjacent server among the initialized servers.

6. The computer-implemented process of claim 1, further comprising:

rearranging, by the processor, a position of multiple users based on the determination to remove one of the initialized servers.

7. The computer-implemented process of claim 1, further comprising:

uniformly distributing, by the processor, the users into the remaining servers after removing several of the initialized servers.

8. A system comprising:

at least one processor; and a memory comprising a set of instructions, wherein the set of instructions are configured to cause the at least one processor to:

configure servers to a set position to receive users to perform various functions;

perform iterations of moving the users to different servers from their original servers based on a determination to add one or more new servers at an endpoint of the system, wherein the users are added to the one or more new servers to maintain uniformity, the uniformity being maintained such that a uniformity ratio of a number of the users per server is greater than a number of the servers; and remove at least one server among the configured servers at another endpoint of the system at a different time interval.

9. The system of claim 8, wherein the set of instructions are further configured to cause the at least one processor to remap at least one of the users to a different server after the least one server is removed.

10. The system of claim 8, wherein the set of instructions are further configured to cause the at least one processor to remap one or more of the users to the endpoint based on the one or more new servers being added.

11. The system of claim 8, wherein the set of instructions are further configured to cause the at least one processor to remap one or more of the users to one of the configured servers adjacent to at least one of the servers removed from the endpoint of the system.

12. The system of claim 8, wherein the set of instructions are further configured to cause the at least one processor to remap one or more users to the one or more new servers added at the other endpoint of the system.

13. The system of claim 8, wherein the set of instructions are further configured to cause the at least one processor to remove another server at one of the endpoints in the system at another time interval.

14. The system of claim 8, wherein each server comprises a different amount of users.

15. A computer program embodied on a non-transitory computer readable medium, the computer program configured to cause a processor to:

configure a plurality of servers within a network to receive a plurality of users, wherein the servers are configured to receive linear data;

assign the plurality of users to the servers, wherein each of the servers throughout the network are configured to receive one or more of the plurality of users;

determine at an endpoint of the network whether to add an additional server or remove one of the servers at the endpoint of the network, wherein a uniformity algorithm identifies one or more of the users to reassign to either the additional server, or to one of the original servers; and reassign one or more of the plurality of users based on the determination of adding the additional server or removing one of the original servers, wherein the reassign is performed using the uniformity algorithm, the uniformity algorithm maintains a uniformity ratio of a number of the users per server greater than a number of the servers and remaps users of a removed server to an adjacent server.

16. The computer program of claim 15, wherein the processor is configured to reassign the users to the additional server at the endpoint within a system.

17. The computer program of claim 15, wherein the processor is configured to map a range of the reassigned users uniformly to the remaining servers based on the determination to remove one of the original servers at the endpoint of the network.

18. The computer program of claim 15, wherein a set number of the servers are configured to remain in an original position within the network.

19. The computer program of claim 15, wherein the processor is configured to identify a number of the users from the plurality of servers to place in the additional server added at the endpoint of the network.

20. The computer program of claim 15, wherein the processor is configured to perform additional iterations of adding/removing additional servers from the endpoint of the network.

* * * * *